Figure 1:
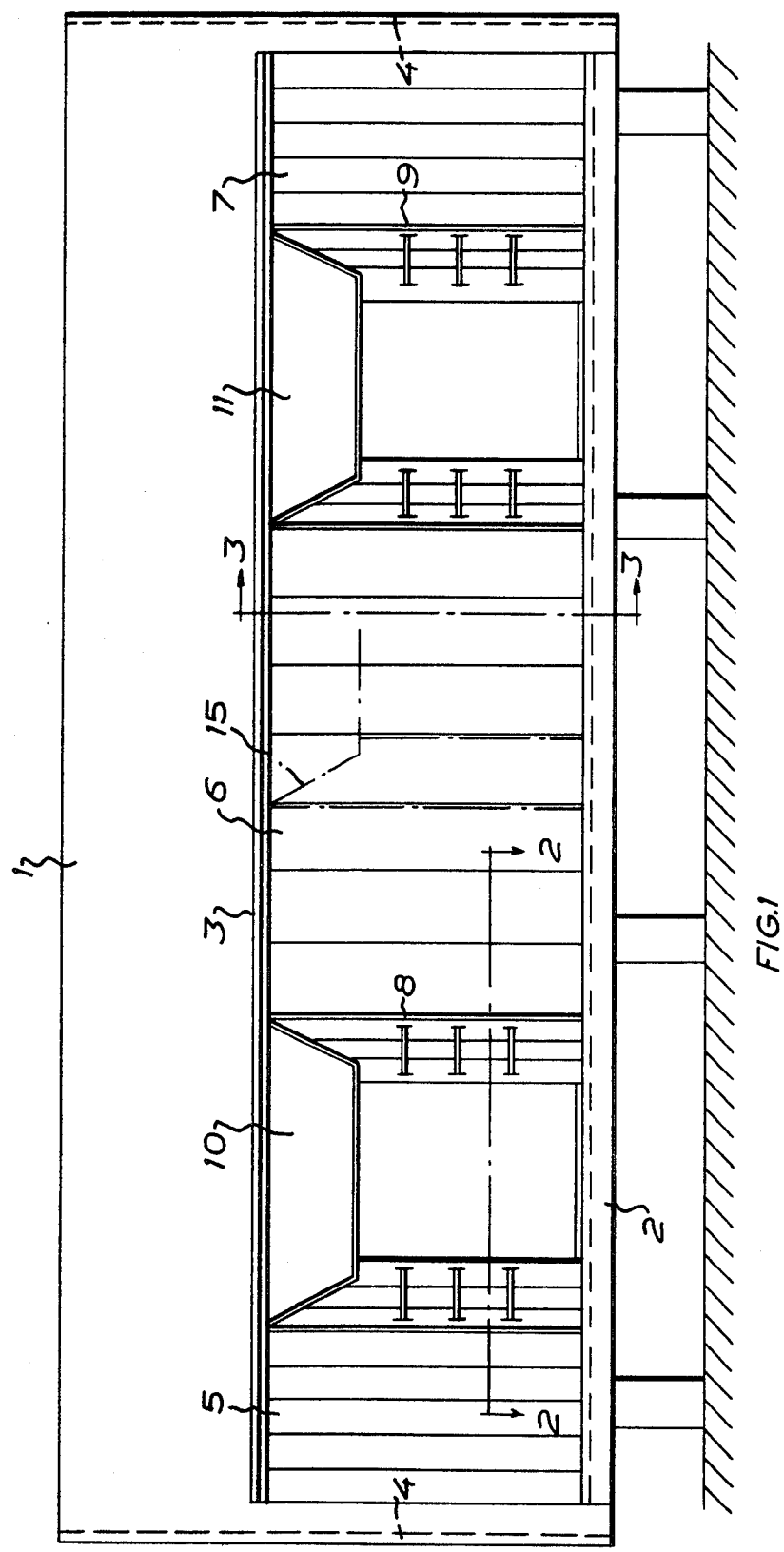

United States Patent [19]

Weibull

[11] 4,104,836
[45] Aug. 8, 1978

[54] DOOR DEVICE IN GOODS DEPOTS OR THE LIKE

[76] Inventor: Torsten Waloddi Weibull, Torapmöllan, Brösarp, Sweden, S-270 44

[21] Appl. No.: 773,742

[22] Filed: Mar. 2, 1977

[30] Foreign Application Priority Data

Mar. 3, 1976 [SE] Sweden .................. 7602972

[51] Int. Cl.² .................. E04B 1/343; E06B 3/94
[52] U.S. Cl. .................. 52/64; 52/173 DS; 160/84 R
[58] Field of Search .................. 52/64, 67, 173 DS; 14/71.5; 135/5 A; 160/84

[56] References Cited

U.S. PATENT DOCUMENTS

| 2,798,502 | 7/1957 | D'Azzo | 135/5 A |
| 2,857,197 | 10/1958 | Hogg | 52/64 X |
| 3,111,076 | 11/1963 | Martin et al. | 160/84 R |
| 3,235,915 | 2/1966 | Glaser | 52/64 |
| 3,256,931 | 6/1966 | Öijerholm | 160/84 R |
| 3,289,741 | 12/1966 | Gossling | 160/84 R |
| 3,826,049 | 7/1974 | Frommelt et al. | 52/64 X |
| 3,850,223 | 11/1974 | Tompkins | 160/84 R |

Primary Examiner—J. Karl Bell
Attorney, Agent, or Firm—Weingarten, Maxham & Schurgin

[57] ABSTRACT

The disclosure relates to a door system in a goods depot or the like, the system covering a substantially rectangular passage into the depot and comprising a frame intended for a door, and wall portions connected to the frame and disposed on either side of the frame in the passage. The frame may be shifted laterally alongside the passage. Moreover, the wall portions connected to the frame cover, irrespective of the shifting position of the frame, portions of the passage located on either side of the frame.

4 Claims, 4 Drawing Figures

DOOR DEVICE IN GOODS DEPOTS OR THE LIKE

The present invention relates to a door device in goods depots or the like, the door device covering a substantially rectangular passage into the depot and comprising a frame intended for a door and wall portions connected with the frame and disposed on either side of the frame in the passage.

Unloading and loading of goods trains at loading bays is, in many places, carried out in the open air without protection against the prevailing weather conditions. In certain installations, a roof is provided over the loading bay but this does not constitute a satisfactory protection for personnel working at the loading bay. In other prior art loading bays, the door frames are disposed directly in the wall of the depot and the doors mounted in the frames consist of bellows which may be pulled out into abutment with an opening into a goods wagon, thereby achieving a weather-sealed passage. The primary object of this prior art device is to prevent draught from occuring in depots, to prevent ice and rain from making the loading-bay slippery and to prevent deep freeze-warehouses from being heated up. Since the openings in the goods wagons are not normally disposed at a mutually constant distance, a disadvantage inherent in these prior art devices is that the train must, during unloading and loading operations, be adapted to the mutually stationary position of the depot doors.

The object of the present invention is to provide a door device which remedies the above-mentioned disadvantages and can, moreover, be adapted to suit extant loading bays.

According to a major aspect of the invention, the frame mentioned by way of introduction is horizontally shiftable alongside the passage to the depot and the wall portions connected to the frame are disposed, irrespective of the shifting position of the frame, to cover portions of the passage located on either side of the frame.

According to a further aspect of the present invention the wall portions consist of laterally shiftable panels.

According to yet another aspect of the present invention, the wall portions consist of telescopic panels.

According to still a further aspect of the present invention, the wall portions may be collapsed and pulled out in accordion fashion.

One advantage inherent in the door device according to the present invention is that loading between the goods wagons is facilitated and made more effective, since simultaneous access to several wagons is made possible.

The present invention and its aspects will be more readily understood from the accompanying drawings and the discussion relating thereto.

Figure 2:
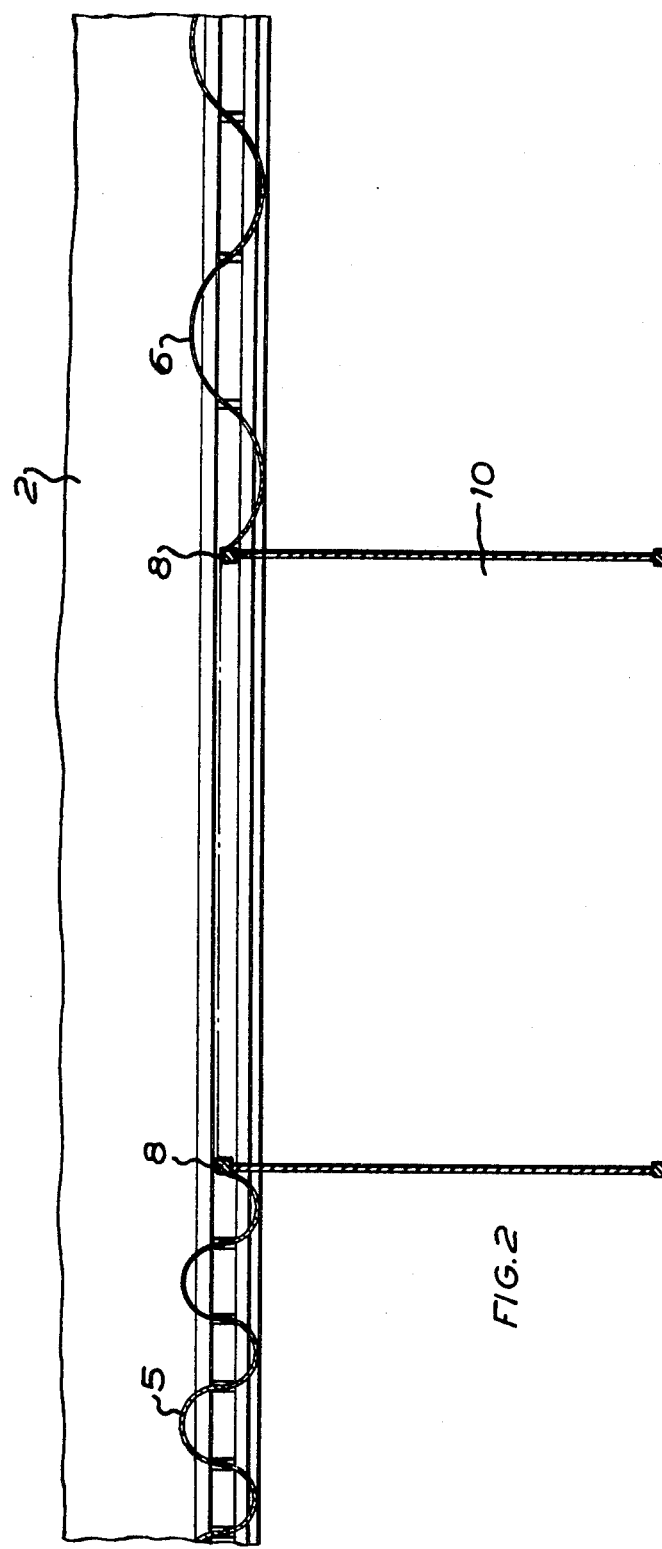
Figure 3:
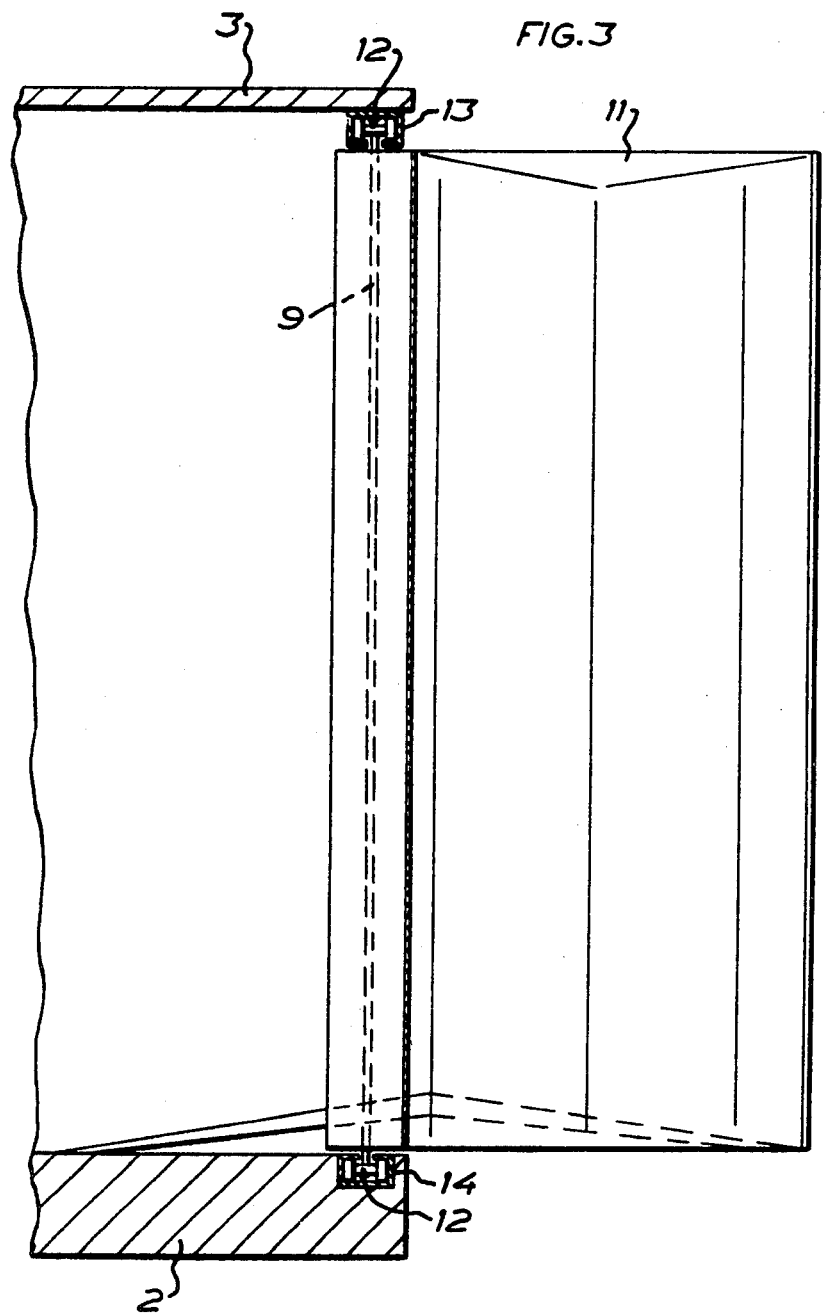
Figure 4:
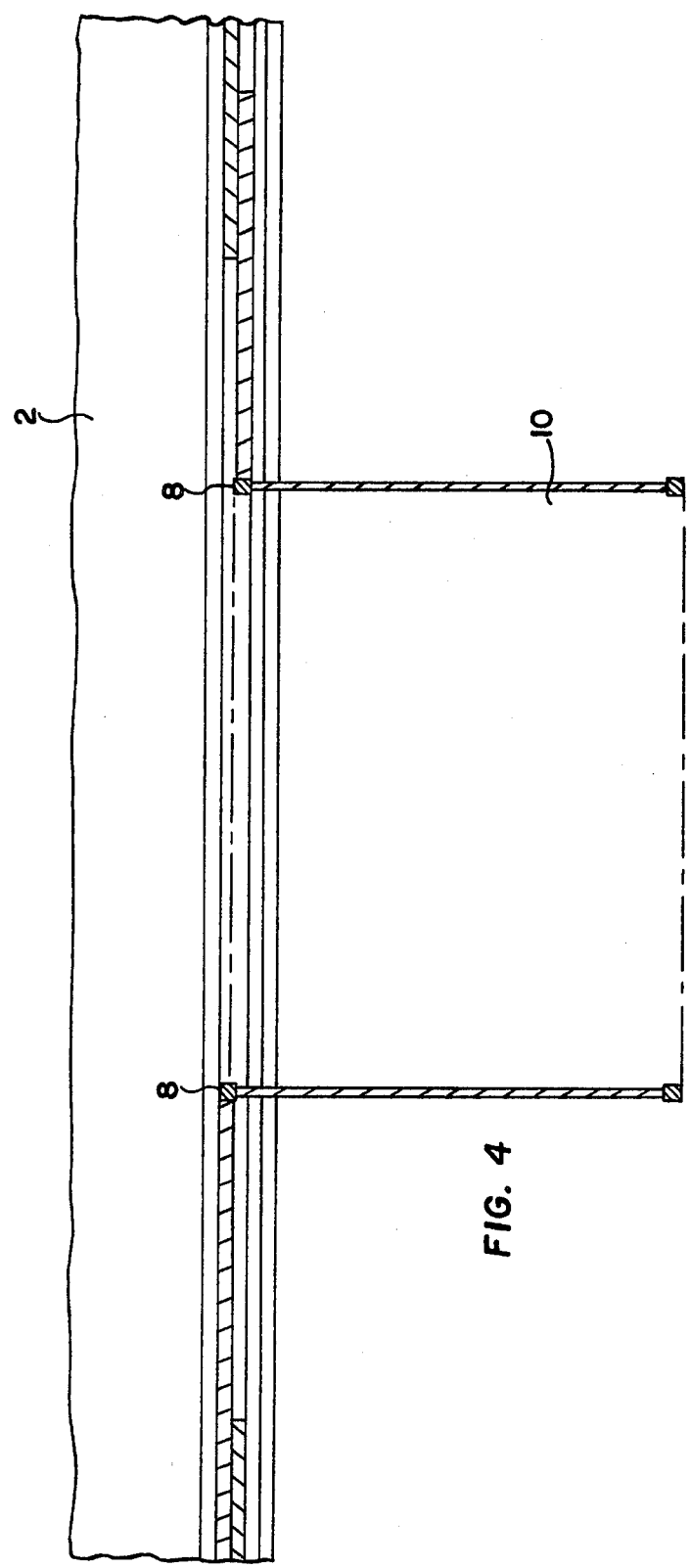

In the accompanying drawings:

FIG. 1. is a front elevation of a door device according to the present invention and illustrates the location of the door device on a loading-bay projecting from a depot;

FIG. 2. is a cross-section of the door device taken along the line 2—2 in FIG. 1;

FIG. 3. is a longitudinal section of a portion of the door device taken along the line 3—3 in FIG. 1; and FIG. 4 is a cross-section similar to FIG. 2 showing telescopic panels.

FIG. 1. shows a good depot 1 with a projecting loading bay 2 which carries a door device according to the present invention. The door device is enclosed, apart from by the loading bay 2, also by a protective roof 3 and walls located at the ends of the loading bay but suggested only with broken lines on the drawing. Consequently, a room is formed on the loading bay which is thereby protected against the weather conditions outside. In the preferred embodiment of the present invention, the door device comprises three wall portions 5, 6, 7 which, in the longitudinal direction of the loading bay, are placed on either side of two frames 8, 9 which support doors 10, 11. These doors consist normally of per se known accordion fold panels for realizing a passage to the opening of the goods wagons.

It is apparent from FIG. 2. that the wall portions 5, 6, 7 may be compressed or drawn out. In this embodiment, the wall portions are made of a foldable sheeting but they can, naturally, be of other designs, such as foldable walls or panels or the like which are telescopically or laterally shiftable see FIG. 4).

Roller means 12 are mounted on the upper and lower edges of the wall portions 5, 6, 7 and the frames 8, 9, the roller means running in upper rails 13 and lower rails 14, respectively. The rail 13 is fixed to the under side of the roof and the rail 14 is cast into the upper surface of the loading bay.

The frames 8, 9 with associated doors 10, 11 can, thus, be shifted along the loading bay and placed before the opening to a goods wagon which is to loaded or unloaded. A position to which the frame 9 with the door 11 can be shifted is shown by means of dot-dash lines at 15 in FIG. 1.

The number of frames with doors and the number of wall portions can be varied and need not be of the number shown in the preferred embodiment.

What I claim and desire to secure by Letters Patent is:

1. A door device in a goods depot or the like, the door device covering a substantially rectangular passage into the depot and comprising a frame intended for a door and wall portions connected to the frame and arranged on either side of the frame in the passage, wherein said frame is horizontally shiftable along said passage, and wherein the wall portions connected to said frame are disposed, irrespective of the shifting position of the frame, to cover portions of the passage located on either side of the frame.

2. Door device as recited in claim 1, wherein said wall portions consist of laterally shiftable panels.

3. Door device as recited in claim 2, wherein said wall portions consist of telescopic panels.

4. Door device as recited in claim 1, wherein said wall portions may be foldingly collapsed together and expanded out.

* * * * *